(12) United States Patent
Sato et al.

(10) Patent No.: US 7,442,469 B2
(45) Date of Patent: Oct. 28, 2008

(54) CATHODE ACTIVE MATERIAL AND NON-AQUEOUS ELECTROLYTE SECONDARY BATTERY

(75) Inventors: Takashi Sato, Fukushima (JP); Takahisa Ishimatsu, Fukushima (JP); Kei Yonezawa, Tokyo (JP); Yoshikatsu Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/674,288

(22) Filed: Feb. 13, 2007

(65) Prior Publication Data

US 2007/0190421 A1   Aug. 16, 2007

(30) Foreign Application Priority Data

Feb. 13, 2006  (JP) .............................. 2006-035531

(51) Int. Cl.
*H01M 4/58*  (2006.01)
(52) U.S. Cl. .............. 429/231.3; 429/231.1; 429/231.2; 429/231.5; 429/231.6; 252/182.1
(58) Field of Classification Search .............. 429/231.1, 429/231.3, 231.2, 231.5, 231.6; 252/182.1
See application file for complete search history.

(56) References Cited

U.S. PATENT DOCUMENTS

2006/0046143 A1*  3/2006  Nakai et al. .............. 429/231.1

FOREIGN PATENT DOCUMENTS

JP       2001-319562       11/2001

* cited by examiner

*Primary Examiner*—Laura S Weiner
(74) *Attorney, Agent, or Firm*—Bell, Boyd & Lloyd LLP

(57) ABSTRACT

A cathode with a cathode active material is provided. The cathode active material is obtained by mixing a zirconium-containing lithium cobalt composite oxide containing zirconium as a sub-component element in a first lithium cobalt composite oxide expressed by a formula $Li_tCoM_sO_2$ (where M is at least one kind of element selected from Fe, V, Cr, Ti, Mg, Al, B, and Ca; $0 \leq s \leq 0.03$; $0.05 \leq t \leq 1.15$), and a second lithium cobalt composite oxide expressed by a formula $Li_xCo_{1-y}A_yO_2$ (where A is at least one kind of element selected from Mg and Al; $0.05 \leq x \leq 1.15$; $0 \leq y \leq 0.03$).

7 Claims, 4 Drawing Sheets

CATHODE ACTIVE MATERIAL AND NON-AQUEOUS ELECTROLYTE SECONDARY BATTERY

CROSS REFERENCES TO RELATED APPLICATIONS

The present application claims priority to Japanese Patent Application JP 2006-035531 filed in the Japanese Patent Office on Feb. 13, 2006, the entire contents of which is being incorporated herein by reference.

BACKGROUND

The present disclosure relates to a cathode active material and a non-aqueous electrolyte secondary battery and, more particularly, to a cathode active material having two kinds of lithium cobalt composite oxides of different compositions and a non-aqueous electrolyte secondary battery using such a cathode active material.

In recent years, owing to the development of electronic apparatuses and the realization of their miniaturization according to the advancement of a semiconductor integrating technique, a demand for a battery serving as a power source of a portable electronic apparatus is rising. Characteristics which are requested to the battery are those of a secondary battery which is small and light weight, can be used for a long time, and can be charged and discharged.

As small secondary batteries having those characteristics, a nickel hydrogen battery, a nickel cadmium battery, a lithium ion secondary battery, and the like can be mentioned. Among them, the lithium ion secondary battery having the high voltage of the 4V grade and a high energy density has large electric power consumption. A demand for the portable electronic apparatus or the like to which the primary battery is rarely used is also increasing.

It is a feature of the lithium ion secondary battery that a battery having a large capacitance, that is, the large energy density can be formed by combining a cathode whose oxidation-reduction potential is higher and an anode whose oxidation-reduction potential is lower as compared with those of other batteries. At present, the lithium cobalt composite oxide is a main stream as a cathode active material of the lithium ion secondary battery.

Although the lithium ion secondary battery using the lithium cobalt composite oxide has such an advantage that an average discharge potential is high, cycle characteristics are not good and a voltage drop at the time of a large-output discharge at a low temperature is large. Therefore, there is such a problem that, for example, when a power source of a personal computer (hereinbelow, abbreviated to a PC) is turned on in a cold district, the PC is not activated due to an insufficient output.

For example, in JP-A-2001-319652, there has been disclosed a lithium cobalt composite oxide expressed by the following general formula.

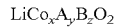

(in the formula, A denotes at least one kind selected from Al, Cr, V, Mn, and Fe; B denotes at least one kind selected from Mg and Ca; x is set to a value within a range of $0.9 \leq x < 1$; y is set to a value within a range of $0.001 \leq y \leq 0.05$; and z is set to a value within a range of $0.001 \leq z \leq 0.05$)

According to the lithium ion secondary battery using such a cathode active material, although high-temperature characteristics can be improved, it is difficult to obtain the satisfactory characteristics with respect to load characteristics and low-temperature characteristics.

Further, for example, to improve the low-temperature output characteristics of the lithium ion secondary battery, a technique for adding zirconium Zr upon synthesis of the lithium cobalt composite oxide has been proposed. Moreover, to improve electrode filling performance, by mixing the lithium cobalt composite oxide added with zirconium Zr as coarse powder or micro powder and using it, the high capacitance of the lithium ion secondary battery can be realized.

However, if the lithium cobalt composite oxide added with zirconium Zr is mixed as coarse powder or micro powder and used, although the high capacitance of a cell can be realized, there is such a problem that the safety deteriorates remarkably. It is also requested to further improve the cycle characteristics and the low-temperature heavy load characteristics.

It is, therefore, desirable to provide a cathode active material which has a high capacitance and can improve cycle characteristics, low-temperature heavy load characteristics, and safety and to provide a non-aqueous electrolyte secondary battery using such a cathode active material.

SUMMARY

According to an embodiment, there is provided a cathode active material in which the first composite oxide and the second composite oxide are mixed wherein, the first composite oxide is a zirconium-containing lithium cobalt composite oxide containing zirconium Zr as a sub-component element in a lithium cobalt composite oxide expressed by formula 1, the second composite oxide is a lithium cobalt composite oxide expressed by formula 2, a content of zirconium Zr lies within a range from 0.0005 or more to 0.01 or less as a mole ratio Zr/Co to cobalt Co in the lithium cobalt composite oxide expressed by the formula 1, and a content of the lithium cobalt composite oxide expressed by the formula 2 lies within a range from 10 wt % or more to 40 wt % or less.

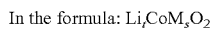 (Formula 1)

M denotes at least one kind of element selected from iron Fe, vanadium V, chromium Cr, titanium Ti, magnesium Mg, aluminum Al, boron B, and calcium Ca; s is set to a value within a range of $0 \leq s \leq 0.03$; and t is set to a value within a range of $0.05 \leq t \leq 1.15$.

 (Formula 2)

A denotes at least one kind of element selected from magnesium Mg and aluminum Al; x is set to a value within a range of $0.05 \leq x \leq 1.15$; and y is set to a value within a range of $0 \leq y \leq 0.03$.

According to another embodiment, there is provided a non-aqueous electrolyte secondary battery comprising a cathode, an anode, a non-aqueous electrolyte, and a separator, wherein the cathode has a cathode active material, in the cathode active material, the first composite oxide and the second composite oxide are mixed wherein, the first composite oxide is a zirconium-containing lithium cobalt composite oxide containing zirconium Zr as a sub-component element in a lithium cobalt composite oxide expressed by formula 1, the second composite oxide is a lithium cobalt composite oxide expressed by formula 2, a content of zirconium Zr lies within a range from 0.0005 or more to 0.01 or less as a mole ratio Zr/Co to cobalt Co in the lithium cobalt composite oxide expressed by the formula 1, and a content of the lithium cobalt composite oxide expressed by the formula 2 lies within a range from 10 wt % or more to 40 wt % or less.

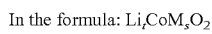 (Formula 1)

M denotes at least one kind of element selected from iron Fe, vanadium V, chromium Cr, titanium Ti, magnesium Mg, aluminum Al, boron B, and calcium Ca; s is set to a value within a range of $0 \leq s \leq 0.03$; and t is set to a value within a range of $0.05 \leq t \leq 1.15$.

In the formula: $Li_xCo_{1-y}A_yO_2$ (Formula 2)

A denotes at least one kind of element selected from magnesium Mg and aluminum Al; x is set to a value within a range of $0.05 \leq x \leq 1.15$; and y is set to a value within a range of $0 \leq y \leq 0.03$.

According to the embodiments, the lithium cobalt composite oxide added with zirconium Zr is used as coarse powder and the lithium cobalt composite oxide having high heat stability is combined as micro powder to such an oxide, so that the battery has the high capacitance and the cycle characteristics, the low-temperature heavy load characteristics, and the safety can be improved.

Specifically speaking, the cathode active material is characterized in that the lithium cobalt composite oxide expressed by the formula 2 is mixed to the zirconium-containing lithium cobalt composite oxide by the amount of 10 to 40 wt %. Further, the zirconium-containing lithium cobalt composite oxide whose 50% arithmetic mean diameter has been specified so as to lie within a range from 10 to 30 μm, both inclusive and the lithium cobalt composite oxide expressed by the formula 2 whose 50% arithmetic mean diameter has been specified so as to lie within a range from 2 to 10 μm, both inclusive are mixed. The non-aqueous electrolyte secondary battery is formed by using the electrode formed by using such a cathode active material so that a volume density lies within a range from 3.1 to 3.7 g/cm³, both inclusive. Thus, the battery has high capacitance and high cycle characteristics, the low-temperature heavy load characteristics, and the safety can be improved.

According to the embodiments, in the non-aqueous electrolyte secondary battery, the battery has the high capacitance and the cycle characteristics, the low-temperature heavy load characteristics, and safety can be improved.

Other features and advantages will be apparent from the following description taken in conjunction with the accompanying drawings, in which like reference characters designate the same or similar parts throughout the figures thereof.

Additional features and advantages are described herein, and will be apparent from, the following Detailed Description and the figures.

DETAILED DESCRIPTION

Figure 1:
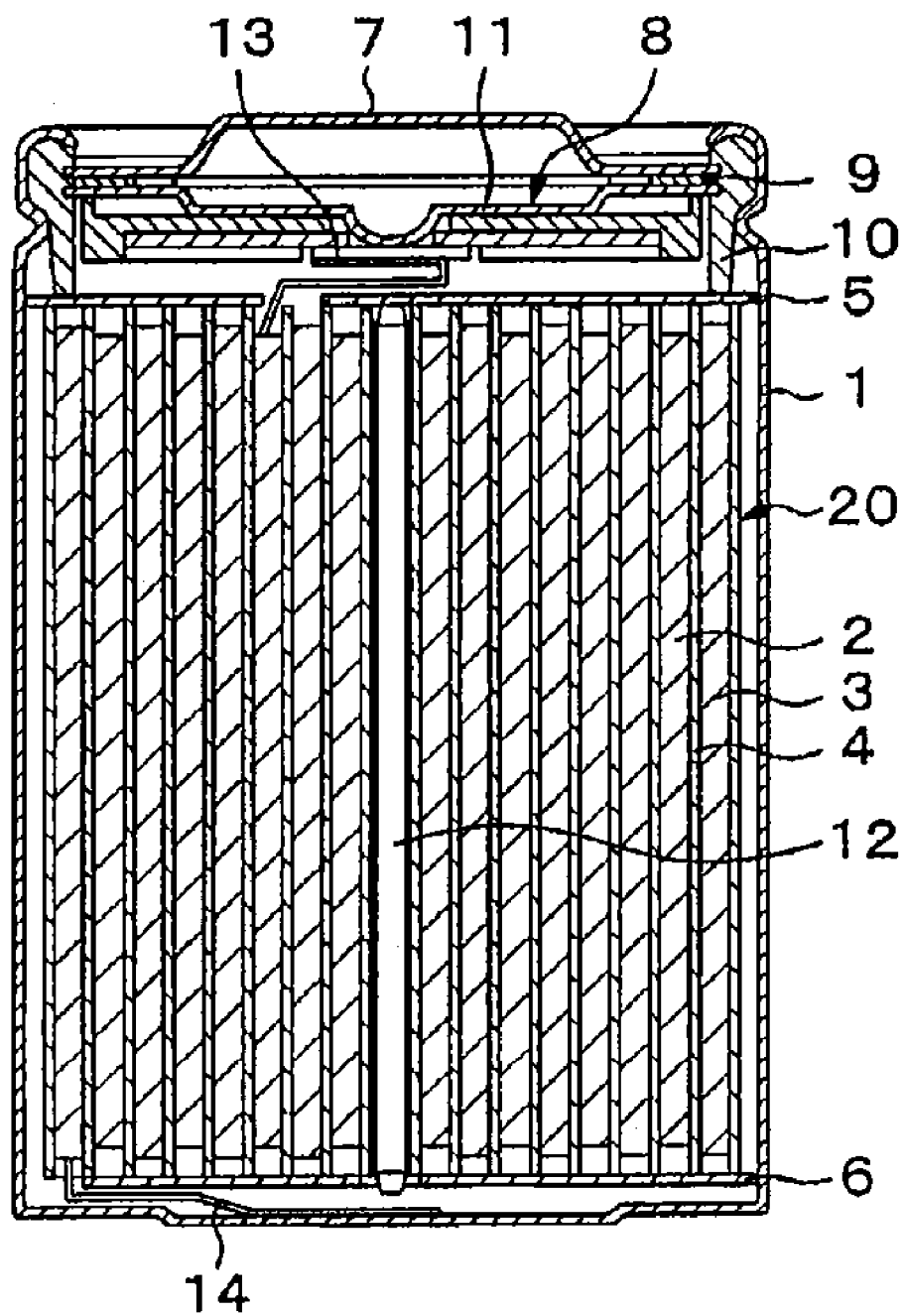
FIG. 1 is a schematic cross sectional view of a non-aqueous electrolyte secondary battery according to the first embodiment.

(1) FIRST EMBODIMENT (1-1) Construction of a Non-Aqueous Electrolyte Secondary Battery Embodiments are described herein with reference to the drawings. FIG. 1 shows a cross sectional structure of a non-aqueous electrolyte secondary battery according to the first embodiment.

In this secondary battery, an open circuit voltage in a full charging state lies within, for example, a range from 4.2 to 4.6 V or a range from 4.25 to 4.6 V. This secondary battery is what is called a cylindrical type and a winded electrode member 20 in which a belt-shaped cathode 2 and a belt-shaped anode 3 have been wound through a separator 4 is provided in an almost hollow cylindrical battery can 1.

The battery can 1 is made of iron Fe plated with, for example, nickel Ni. One end portion of the battery can 1 is closed and the other end portion is opened. A pair of insulating plates 5 and 6 are arranged in the battery can 1 perpendicularly to a winding circumferential surface so as to sandwich the winded electrode member 20, respectively.

A battery cap 7 and a relief valve mechanism 8 and a thermally-sensitive resistive element (PTC element: Positive Temperature Coefficient element) 9 provided in the battery cap 7 are caulked through a gasket 10 and attached to the open end portion of the battery can 1. The inside of the battery can 1 is sealed. The battery cap 7 is made of, for example, a material similar to that of the battery can 1. The relief valve mechanism 8 is electrically connected to the battery cap 7 through the PTC element 9. When an inner pressure of the battery rises to a predetermined value or more due to an inner short-circuit, heating from the outside, or the like, a disk plate 11 is turned round, thereby disconnecting the electrical connection between the battery cap 7 and the winded electrode member 20. When a temperature rises, a current is limited by an increase in resistance value of the PTC element 9 and abnormal heat generation by the large current is prevented. The gasket 10 is made of, for example, an insulating material and its surface is coated with asphalt.

The winded electrode member 20 is wound around, for example, a center pin 12 as a center. A cathode lead 13 made of, for example, aluminum Al or the like is connected to the cathode 2 of the winded electrode member 20. An anode lead 14 made of, for example, nickel Ni or the like is connected to the anode 3. The cathode lead 13 is welded to the relief valve mechanism 8, so that it is electrically connected to the battery cap 7. The anode lead 14 is welded and electrically connected to the battery can 1.

[Cathode]

Figure 2:
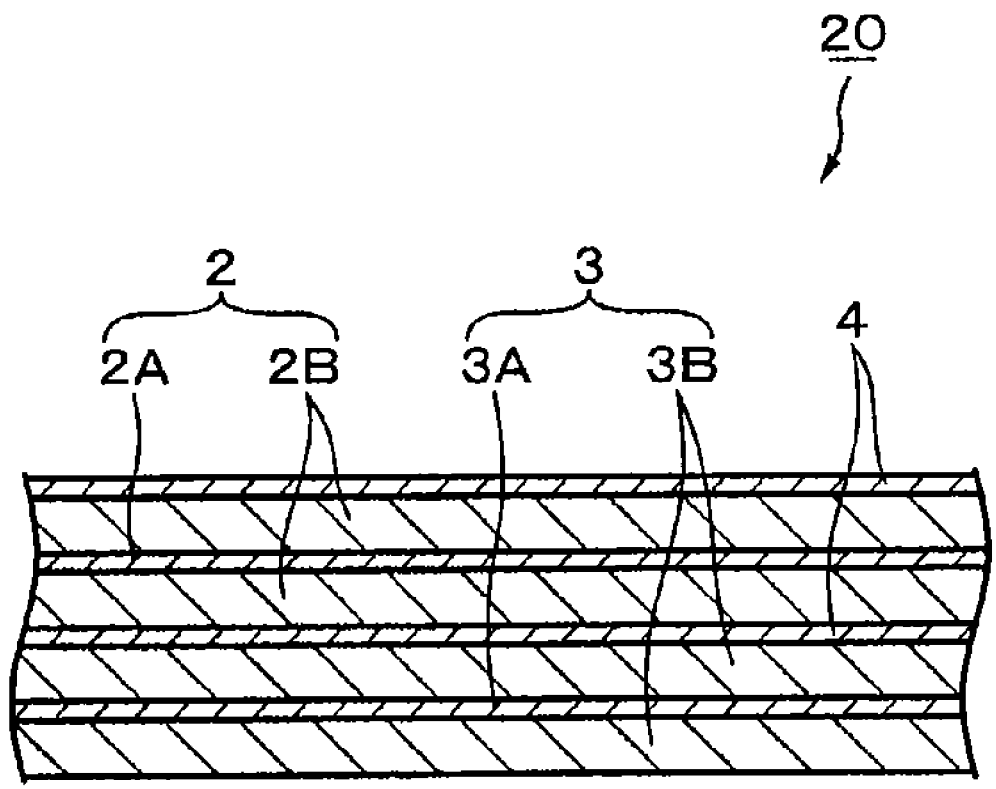
FIG. 2 is a partially enlarged cross sectional view of a winded electrode member shown in FIG. 1.

FIG. 2 partially enlargedly shows the winded electrode member 20 shown in FIG. 1. As shown in FIG. 2, for example, the cathode 2 has: a cathode collector 2A having a pair of surfaces which face each other; and cathode mixture layers 2B formed on both surfaces of the cathode collector 2A. It is preferable that an electrode volume density of the cathode 2 lies within a range from 3.45 to 3.70 g/cm³, both inclusive. This is because if it is smaller than 3.45 g/cm³, the battery capacitance decreases and if it is larger than 3.70 g/cm³, it is difficult to form the cathode mixture layers 2B by pressing.

The cathode collector 2A is made of, for example, a metal foil such as aluminum Al foil, stainless SUS foil, nickel Ni foil, or the like. The cathode mixture layer 2B contains, for example, a cathode active material and may contain a conductive material such as graphite or the like and a binder such as polyvinylidene fluoride or the like as necessary.

[Cathode Active Material]

As a cathode active material, a material in which a zirconium-containing lithium cobalt composite oxide containing zirconium Zr as a sub-component element in a lithium cobalt composite oxide expressed by a formula 1 and a lithium cobalt composite oxide expressed by a formula 2 have been mixed is used.

$Li_tCoM_sO_2$ (Formula 1)

where M denotes at least one kind of element selected from iron Fe, vanadium V, chromium Cr, titanium Ti, magnesium Mg, aluminum Al, boron B, and calcium Ca; s is set to a value within a range of $0 \leq s \leq 0.03$; and t is set to a value within a range of $0.05 \leq t \leq 1.15$.

$$Li_xCo_{1-y}A_yO_2 \quad \text{(Formula 2)}$$

where A denotes at least one kind of element selected from magnesium Mg and aluminum Al; x is set to a value within a range of $0.05 \leq x \leq 1.15$; and y is set to a value within a range of $0 \leq y \leq 0.03$.

It is preferable that a content of zirconium Zr lies within a range from 0.0005 or more to 0.01 or less as a mole ratio Zr/Co to cobalt Co in the lithium cobalt composite oxide expressed by the formula 1. As a compound of, for example, zirconium oxide, lithium zirconate, or the like, at least a part of zirconium Zr exists in a crystal grain boundary of the lithium cobalt composite oxide expressed by the formula 1. Thus, a crystal structure of the lithium cobalt composite oxide can be stabilized. A part of zirconium Zr may have been solid-dissolved in the lithium cobalt composite oxide expressed by the formula 1 or may exist on the surfaces of the particle of the lithium cobalt composite oxide expressed by the formula 1.

A content of the lithium cobalt composite oxide expressed by the formula 2 lies within a range from 10 wt % or more to 40 wt % or less to a total amount of the cathode active material. This is because if it is smaller than 10 wt % or, contrarily, larger than 40 wt %, the filling density of the electrode decreases and an initial capacitance decreases.

The lithium cobalt composite oxide expressed by each of the formulae 1 and 2 has a crystal structure having a stratified structure of the hexagonal system. As mentioned above, as for lithium Li, it is preferable that t is set to a value within a range of $0.05 \leq t \leq 1.15$ and x is set to a value within a range of $0.05 \leq x \leq 1.15$. It is preferable that the lithium cobalt composite oxide expressed by the formula 1 is primary particle. This is because if it is secondary particle, since a volume density of the electrode does not increase, a cell capacitance decreases.

It is preferable that an arithmetic mean diameter of the zirconium-containing lithium cobalt composite oxide lies within a range from 10 to 30 μm, both inclusive. This is because if it is smaller than 10 μm, the electrode filling performance deteriorates and the cell capacitance decreases, and if it is larger than 30 μm, the volume density of the electrode does not increase and the low-temperature load characteristics also deteriorate. It is preferable that an arithmetic mean diameter of the lithium cobalt composite oxide expressed by the formula 2 lies within a range from 2 to 10 μm, both inclusive. This is because if it is smaller than 2 μm, it is difficult to manufacture such an oxide, and if it is larger than 10 μm, the volume density of the electrode does not increase and the initial capacitance decreases.

[Anode]

As shown in FIG. 2, for example, the anode 3 has: an anode collector 3A having a pair of surfaces which face each other; and anode mixture layers 3B formed on both surfaces of the anode collector 3A. The anode collector 3A is made of, for example, a metal foil such as copper Cu foil, stainless SUS foil, nickel Ni foil, or the like. The anode mixture layer 3B contains, for example, an anode active material and may contain a binder such as polyvinylidene fluoride or the like as necessary.

An anode material which can dope and dedope lithium (hereinafter, properly referred to as an anode material which can dope/dedope lithium) is contained as an anode active material. As an anode material which can dope/dedope lithium, for example, a carbon material, a metal compound, an oxide, a sulfide, a lithium nitride such as $LiN_3$, lithium metal, metal which forms an alloy together with lithium, a high molecular material, or the like can be mentioned.

As a carbon material, for example, graphitization-retardant carbon, graphitization-easy carbon, graphite, a pyrolytic carbon class, a coke class, a glassy carbon class, an organic high molecular compound baked material, carbon fiber, or activated charcoal can be used. Among them, there is a pitch coke, a needle coke, a petroleum coke, or the like as a coke. The organic high molecular compound baked material denotes a material obtained by baking a high molecular material such as phenol resin, fran resin, or the like at a proper temperature and carbonating it. A part of those materials are classified into graphitization-retardant carbon or graphitization-easy carbon. Polyacetylene, polypyrrole, or the like can be mentioned as a high molecular material.

Among such anode materials which can dope/dedope lithium, a material whose charge/discharge potential is relatively close to that of lithium metal is preferable. This is because the lower the charge/discharge potential of the anode 3 is, the easier the high-energy density of the battery can be realized. Among them, the carbon material is preferable from viewpoints that a change in crystal structure occurring upon charging/discharging is very small, a high charge/discharge capacitance can be obtained, and the good cycle characteristics can be obtained. Particularly, graphite is preferable from viewpoints that an electrochemical equivalent is large and a high energy density can be obtained. In addition, graphitization-retardant carbon is preferable from a viewpoint that the excellent cycle characteristics can be obtained.

As an anode material which can dope/dedope lithium, a lithium metal simple substance or a simple substance, an alloy, or a compound of metal elements or semimetal elements which can form an alloy together with lithium can be mentioned. They are preferable because the high energy density can be obtained. Particularly, if such a material is used together with the carbon material, it is more preferable because the high energy density can be obtained and the excellent cycle characteristics can be also obtained. In the specification, among alloys, in addition to an alloy consisting of two or more kinds of metal elements, an alloy consisting of one or more kinds of metal elements and one or more kinds of semimetal elements is also included. As its texture, there is a solid solution, an eutectic (eutectic mixture), an intermetallic compound, or a texture in which two or more kinds of them coexist.

As such a metal element or semimetal element, tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, or hafnium Hf can be mentioned. As an alloy or a compound of them, for example, a material expressed by a chemical formula $Ma_sMb_tLi_u$ or a chemical formula $MaMc_qMd_r$ can be mentioned. In those chemical formulae, Ma denotes at least one kind of metal elements and semimetal elements which can form an alloy together with lithium, Mb denotes at least one kind of metal elements and semimetal elements other than lithium and Ma, Mc denotes at least one kind of non-metal elements, and Md denotes at least one kind of metal elements and semimetal elements other than Ma. Values of s, t, u, p, q, and r a reset to $s>0$, $t \geq 0$, $u \geq 0$, $p>0$, $q>0$, and $r \geq 0$, respectively.

Among them, a simple substance, an alloy, or a compound of metal elements or semimetal elements of the 4B group in the short period type periodic table is preferable. Silicon, tin, or an alloy or a compound of them is particularly preferable. They may be crystalline or amorphous.

As another material, an inorganic compound which does not contain lithium, such as $MnO_2$, $V_2O_5$, $V_6O_{13}$, NiS, MoS, or the like can be also used for either the cathode or the anode.

[Electrolytic Solution]

As an electrolytic solution, a non-aqueous electrolytic solution obtained by dissolving an electrolytic salt into a non-aqueous solvent can be used. As a non-aqueous solvent, for example, it is preferable to contain at least either ethylene carbonate or propylene carbonate because the cycle characteristics can be improved. Particularly, it is preferable that ethylene carbonate and propylene carbonate are mixed and contained because the cycle characteristics can be further improved. As a non-aqueous solvent, it is preferable to contain at least one kind selected from chain-like carbonic esters such as diethyl carbonate, dimethyl carbonate, ethylmethyl carbonate, and methylpropyl carbonate, and the like because the cycle characteristics can be further improved.

Further, as a non-aqueous solvent, it is preferable to contain at least either 2,4-difluoroanisole or vinylene carbonate. This is because the discharge capacitance can be improved in the case of 2,4-difluoroanisole and the cycle characteristics can be further improved in the case of vinylene carbonate. Particularly, if they are mixed and contained, it is more preferable because both of the discharge capacitance and the cycle characteristics can be improved.

Moreover, as a non-aqueous solvent, it is also possible to contain one kind or two or more kinds selected from butylene carbonate, γ-butyrolactone, γ-valerolactone, a material in which a part or all of a hydrogen radical of a compound of them is replaced by a fluorine radical, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulfolan, dimethyl sulfoxide, trimethyl phosphate, and the like.

In dependence on the electrode which is combined, there is a case where the reversibility of the electrode reaction is improved by using a material in which a part or all of the hydrogen atoms of the substance contained in the group of non-aqueous solvents mentioned above has been replaced by fluorine atoms. Therefore, those substances can be also properly used as a non-aqueous solvent.

As a lithium salt as an electrolytic salt, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2(O_x)$, LiBOB, or LiBr is properly used. One kind or two or more kinds of them can be mixed and used. Among them, $LiPF_6$ is preferable from viewpoints that the high ion conductivity can be obtained and the cycle characteristics can be improved.

[Separator]

As a material of the separator, a material used for the battery in the related art can be used. For example, a woven cloth, a nonwoven cloth, a synthetic resin microporous membrane, and the like can be mentioned. Among them, the synthetic resin microporous membrane is preferable. For example, it is particularly preferable to use a microporous film made of polyolefin from viewpoints that an excellent short-circuit preventing effect is obtained and safety of the battery can be improved owing to a shut-down effect. More specifically speaking, as a microporous film made of polyolefin, for example, a microporous membrane made of a polyethylene or polypropylene resin can be used.

Further, as a material of the separator, it is more preferable to use a material obtained by laminating or mixing polyethylene whose shut-down temperature is lower and polypropylene having excellent oxidation resistance from a viewpoint that both shut-down performance and floating characteristics can be satisfied.

(1-2) Manufacturing Method of Non-Aqueous Electrolyte Battery

A manufacturing method of the non-aqueous electrolyte battery according to the first embodiment is described below. The manufacturing method of the non-aqueous electrolyte battery will be explained hereinbelow with respect to a cylindrical non-aqueous electrolyte battery as an example.

The cathode 2 is manufactured as follows. First, for example, by mixing the cathode active material, conductive material, and binder, the cathode mixture is adjusted and formed. This cathode mixture is dispersed into the solvent of, for example, N-methyl-2-pyrolidone or the like, thereby forming the cathode mixture slurry.

As a synthesizing method of the zirconium-containing lithium cobalt composite oxide as a cathode active material, for example, a cobalt Co oxide and zirconium Zr are adjusted and mixed as transition metal sources in accordance with the compositions. $LiCO_3$ serving as a lithium source is mixed to the resultant mixture. They are baked in the atmospheric environment at temperatures of 850 to 1100° C., thereby obtaining such an oxide. As transition metal sources, for example, carbonate, nitrate, sulfate, or the like of a transition metal can be used. A hydroxide, carbonate, or the like of a composite transition metal containing a plurality of transition metals can be also used. The transition metal sources are not limited to those mentioned above. As a starting raw material of the lithium source, for example, $Li_2O$, LiOH, $H_2O$, $LiNiO_3$, or the like can be used as a material other than those mentioned above. Since a synthesizing method of the lithium cobalt composite oxide expressed by the formula 2 is also similar to that mentioned above, its detailed description if omitted.

Subsequently, the cathode collector 2A is coated with the cathode mixture slurry, the solvent is dried, thereafter, the obtained collector is compression-molded by a roll pressing machine or the like, the cathode mixture layer 2B is formed, and the cathode 2 is manufactured.

The anode 3 is manufactured as follows. First, for example, the anode active material and binder are mixed and the anode mixture is adjusted and formed. This anode mixture is dispersed into the solvent of, for example, N-methyl-2-pyrolidone or the like, thereby forming the anode mixture slurry.

Subsequently, the anode collector 3A is coated with the anode mixture slurry, the solvent is dried, thereafter, the obtained collector is compression-molded by the roll pressing machine or the like, the anode mixture layer 3B is formed, and the anode 3 is manufactured.

Subsequently, the cathode lead 13 is attached to the cathode collector 2A by, for example, welding or the like and the anode lead 14 is attached to the anode collector 3A by welding or the like. The cathode 2 and the anode 3 are wound through the separator 4, a front end portion of the cathode lead 13 is welded to the relief valve mechanism 8, a front end portion of the anode lead 14 is welded to the battery can 1, and the wound cathode 2 and anode 3 are sandwiched by a pair of insulating plates 5 and 6 and enclosed in the battery can 1.

Subsequently, the electrolytic solution is injected into the battery can 1 and dipped into the separator 4. The battery cap 7, relief valve mechanism 8, and PTC element 9 are caulked and fixed to the open end portion of the battery can 1 through the gasket 10. Thus, the non-aqueous electrolyte secondary battery according to the first embodiment is manufactured in this manner.

In the non-aqueous electrolyte secondary battery according to the first embodiment, when the charge is performed, for example, lithium ions are dedoped from the cathode 2 and doped into the anode 3 through the electrolytic solution. When the discharge is performed, for example, the lithium ions are dedoped from the anode 3 and doped into the cathode 2 through the electrolytic solution.

Figure 3:
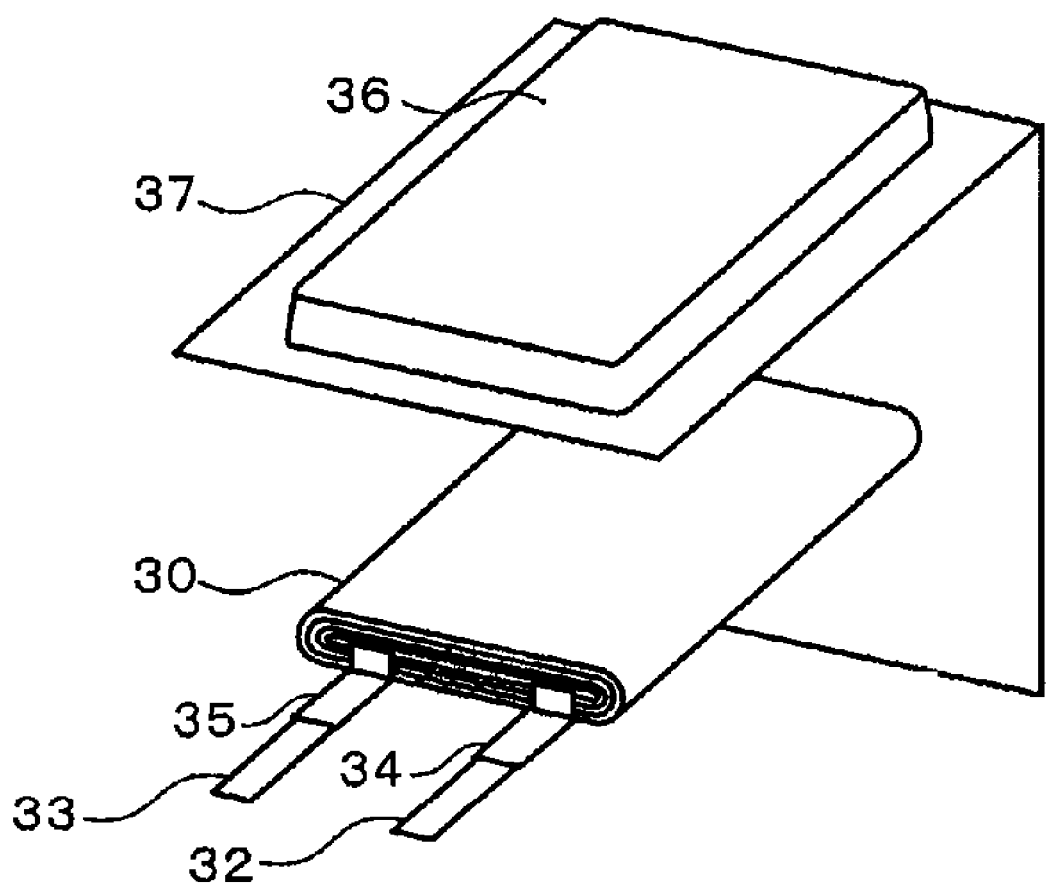
FIG. 3 is a schematic diagram showing a structure of a non-aqueous electrolyte secondary battery according to the second embodiment.

(2) SECOND EMBODIMENT (2-1) Construction of Non-Aqueous Electrolyte Secondary Battery FIG. 3 shows a structure of a non-aqueous electrolyte secondary battery according to the second embodiment. As shown in FIG. 3, the non-aqueous electrolyte secondary battery is formed by a method whereby a battery element 30 is enclosed into a sheathing member 37 made of a moisture-proof laminate film and the circumference of the battery element 30 is welded so as to be sealed. A cathode lead 32 and an anode lead 33 are provided for the battery element 30. Those leads are sandwiched by the sheathing member 37 and led out to the outside. Both surfaces of each of the cathode lead 32 and the anode lead 33 are covered with resin members 34 and 35 in order to improve adhesion with the sheathing member 37.

[Sheathing Member]

The sheathing member 37 has a laminate structure in which, for example, an adhesive layer, a metal layer, and a surface protecting layer have sequentially been laminated. The adhesive layer is made of a high molecular film. As a material constructing the high molecular film, for example, polypropylene PP, polyethylene PE, casted polypropylene (non-oriented polypropylene) CPP, linear low-density polyethylene LLDPE, or a low-density polyethylene LDPE can be mentioned. The metal layer is made of a metal foil. As a material constructing the metal foil, for example, aluminum Al can be mentioned. As a material constructing the metal foil, metal other than aluminum can be also used. As a material constructing the surface protecting layer, for example, nylon Ny or polyethylene terephthalate PET can be mentioned. The surface of the adhesive layer becomes an enclosing surface of the side where the battery element 30 is enclosed.

[Battery Element]

Figure 4:
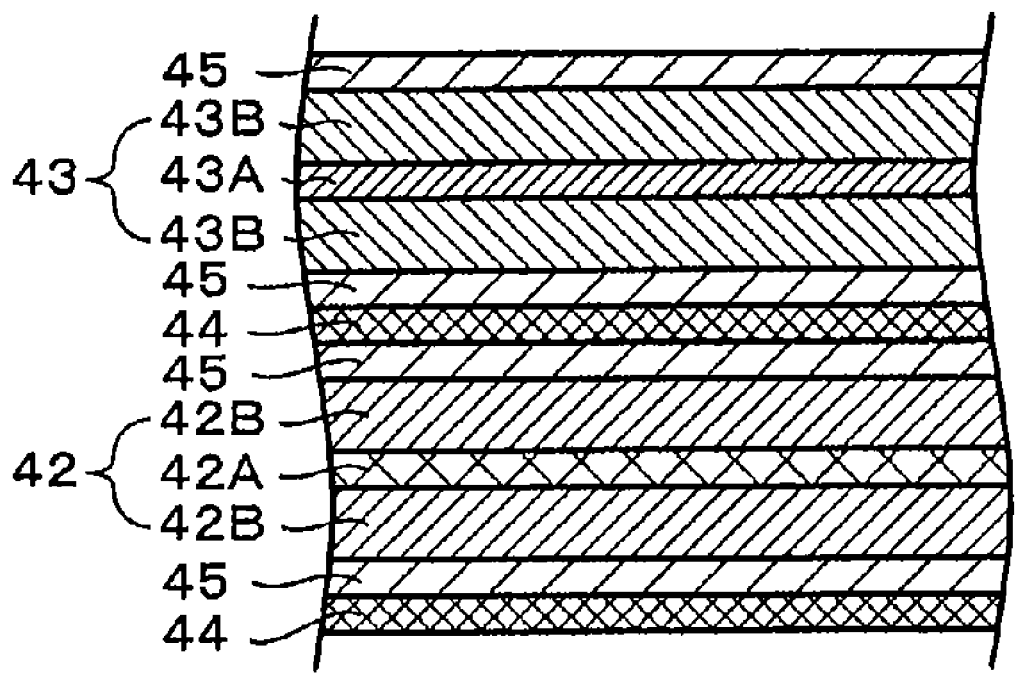
FIG. 4 is a partially enlarged cross sectional view of a battery element shown in FIG. 3.

For example, as shown in FIG. 4, the battery element 30 is a winding type battery element 30 constructed in such a manner that a belt-shaped anode 43 provided with gel electrolyte layers 45 on both sides, a separator 44, a belt-shaped cathode 42 provided with the gel electrolyte layers 45 on both sides, and the separator 44 are laminated and wound in the longitudinal direction.

The cathode 42 is constructed by a belt-shaped cathode collector 42A and cathode active material layers 42B formed on both surfaces of the cathode collector 42A. The cathode collector 42A is a metal foil made of, for example, aluminum Al or the like.

The cathode lead 32 connected by, for example, spot welding or ultrasonic welding is provided for one end portion in the longitudinal direction of the cathode 42. As a material of the cathode lead 32, for example, a metal such as aluminum Al or the like can be used.

The anode 43 is constructed by a belt-shaped anode collector 43A and anode active material layers 43B formed on both surfaces of the anode collector 43A. The anode collector 43A is constructed by, for example, a metal foil such as copper Cu foil, nickel Ni foil, stainless SUS foil, or the like.

The anode lead 33 connected by, for example, the spot welding or ultrasonic welding is also provided for one end portion in the longitudinal direction of the anode 43 in a manner similar to the cathode 42. As a material of the anode lead 33, for example, copper Cu, nickel Ni, or the like can be used.

Since a construction other than the gel electrolyte layer 45 is similar to that of the foregoing first embodiment, explanation is provided below with respect to the gel electrolyte layer 45.

The gel electrolyte layer 45 contains an electrolytic solution and a high molecular compound serving as a holding member to hold the electrolytic solution and is in what is called a gel state. The gel electrolyte layer 45 is preferable because the high ion conductivity can be obtained and a leakage of a solution in the battery can be prevented. A construction of the electrolytic solution (that is, a liquid solvent, electrolytic salt, additive agent) is similar to that in the first embodiment.

As a high molecular compound, for example, there can be mentioned: polyacrylonitrile; polyvinylidene fluoride; copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; polycarbonate; or the like. Polyacrylonitrile, polyvinylidene fluoride, polyhexafluoro propylene, or polyethylene oxide is preferable, particularly, from a viewpoint of electrochemical stability.

(2-2) Manufacturing Method of Non-Aqueous Electrolyte Secondary Battery

A manufacturing method of the non-aqueous electrolyte secondary battery according to the second embodiment is described below. First, each of the cathode 42 and the anode 43 is coated with a presolvent containing a solvent, electrolytic salt, a high molecular compound and a mixed solvent, and the mixed solvent is volatilized, thereby forming the gel electrolyte layer 45. The cathode lead 32 is preliminarily attached to an end portion of the cathode collector 42A by welding. The anode lead 33 is also preliminarily attached to an end portion of the anode collector 43A by welding.

Subsequently, the cathode 42 and anode 43 on each of which the gel electrolyte layer 45 has been formed are laminated through the separator 44, thereby obtaining a laminate. After that, this laminate is wound in its longitudinal direction, thereby forming the winding type battery element 30.

Then, a concave portion 36 is formed by deep-drawing the sheathing member 37 made of a laminate film. The battery element 30 is inserted into the concave portion 36. An unprocessed portion of the sheathing member 37 is folded to an upper portion of the concave portion 36 and an outer peripheral portion of the concave portion 36 is thermally welded, thereby sealing. In this manner, the non-aqueous electrolyte secondary battery according to the second embodiment is manufactured.

EXAMPLES

Examples will now be specifically described. However, the embodiments are not limited only to the following Examples. In Examples and Comparisons, which will be described hereinbelow, a zirconium-containing lithium cobalt composite oxide containing zirconium Zr as a sub-component element in a lithium cobalt composite oxide which can be expressed by a general formula $Li_xCoM_sO_2$ and the lithium cobalt composite oxide which can be expressed by the general formula $Li_tCoM_sO_2$ are properly referred to as a cathode material I. The lithium cobalt composite oxide which can be expressed by the general formula $Li_xCo_{1-y}A_yO_2$ is properly referred to as a cathode material II.

Examples 1 to 12, Comparisons 1 to 11

Example 1

Manufacturing of Cathode Material I

Lithium carbonate, cobalt oxide, and zirconium oxide are mixed in such a manner that in the general formula $Li_tCoM_sO_2$, t=1.15, s=0, and a content of zirconium Zr is equal to 0.0005 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in a lithium cobalt composite oxide expressed by $Li_{1.15}CoO_2$.

Manufacturing of Cathode Mixture Slurry

Subsequently, the cathode material I formed as mentioned above and the lithium cobalt composite oxide ($Li_{1.10}Co_{0.98}Al_{0.01}Mg_{0.01}O_2$) as a cathode material II are mixed at a weight ratio of (cathode material I:cathode material II=9:1).

Subsequently, the graphite of 7 weight % as a conductive material and polyvinylidene fluoride of 3 weight % as a binder are mixed into the mixed cathode material of 90 weight % and dispersed into N-methyl-2-pyrolidone, thereby forming a cathode mixture slurry.

Manufacturing of Non-Aqueous Electrolyte Secondary Battery

A cylindrical non-aqueous electrolyte secondary battery is formed by using the cathode mixture slurry as is explained hereinbelow.

A cathode is formed as follows. Both surfaces of the belt-shaped aluminum foil having a thickness of 15 μm are uniformly coated with the cathode mixture slurry and both slurry layers are dried. After that, they are compression-molded by a roller pressing machine, thereby forming a belt-shaped cathode.

An anode is formed as follows. As an anode active material, polyvinylidene fluoride PVdF of 10 weight % is mixed to powdery artificial graphite of 90 weight % and dispersed into N-methyl-2-pyrolidone, thereby forming an anode mixture slurry. Both surfaces of the copper foil having a thickness of 12 μm are uniformly coated with the anode mixture slurry and both slurry layers are dried. After that, they are compression-molded by the roller pressing machine, thereby forming a belt-shaped anode.

After the belt-shaped cathode and anode were formed, porous polyolefin is used as a separator. The separator, cathode, and anode are laminated in order of the anode, separator, cathode, and separator. By winding the laminate body into a spiral shape a number of times, a spiral-shaped electrode member is formed.

Subsequently, the electrode member is enclosed into a nickel-plated battery can made of iron. Insulating plates are arranged on both of the upper and lower surfaces of the electrode member. One end of the cathode lead made of aluminum is led out of the cathode collector and welded to a projecting portion of a relief valve whose electrical conduction with the battery cap has been assured. The anode lead made of nickel is led out of the anode collector and welded to a bottom portion of the battery can.

An electrolytic solution is obtained by dissolving $LiPF_6$ into a mixture solution in which a volume mixture ratio of ethylene carbonate and methylethyl carbonate is equal to 1:1 so as to have a concentration of 1 mol/dm³, thereby adjusting a non-aqueous electrolytic solution.

Subsequently, after the electrolytic solution was injected into the battery can in which the electrode member has been assembled, the battery can is caulked through an insulation sealing gasket, thereby fixing the relief valve, PTC element, and battery cap. In this manner, the cylindrical non-aqueous electrolyte secondary battery having an outer diameter of 18 mm and a height of 65 mm of Example 1 is formed.

Example 2

As a cathode material I, commercially available lithium carbonate, cobalt oxide, and zirconium oxide are mixed in such a manner that in the general formula $Li_tCoM_sO_2$, t=1.15, s=0, and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoO_2$. A secondary battery of Example 2 is formed by executing subsequent steps in a manner similar to those in Example 1.

Example 3

As a cathode material I, commercially available lithium carbonate, cobalt oxide, and zirconium oxide are mixed in such a manner that in the general formula $Li_tCoM_sO_2$, t=1.15, s=0, and the content of zirconium Zr is equal to 0.0100 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoO_2$. A secondary battery of Example 3 is formed by executing subsequent steps in a manner similar to those in Example 1.

Example 4

As a cathode material I, commercially available lithium carbonate, cobalt oxide, zirconium oxide, and aluminum hydroxide are mixed in such a manner that in the general formula $Li_tCoM_sO_2$, t=1.15, s=0.03 (Al), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoAl_{0.03}O_2$. A secondary battery of Example 4 is formed by executing subsequent steps in a manner similar to those in Example 1.

Example 5

As a cathode material I, commercially available lithium carbonate, cobalt oxide, zirconium oxide, and magnesium carbonate are mixed in such a manner that in the general formula $Li_tCoM_sO_2$, t=1.15, s=0.03 (Mg), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoMg_{0.03}O_2$. A secondary battery of Example 5 is formed by executing subsequent steps in a manner similar to those in Example 1.

Example 6

As a cathode material I, commercially available lithium carbonate, cobalt oxide, zirconium oxide, aluminum hydroxide, and magnesium carbonate are mixed in such a manner that in the general formula $Li_tCoM_sO_2$, t=1.15, s=0.03 (Al; 0.015, Mg; 0.015), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. A secondary battery of Example 6 is formed by executing subsequent steps in a manner similar to those in Example 1.

Example 7

As a cathode material I, commercially available lithium carbonate, cobalt oxide, zirconium oxide, and ferric hydroxide are mixed in such a manner that in the general formula $Li_tCoM_sO_2$, t=1.15, s=0.03 (Fe), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoFe_{0.03}O_2$. A secondary battery of Example 7 is formed by executing subsequent steps in a manner similar to those in Example 1.

Example 8

As a cathode material I, commercially available lithium carbonate, cobalt oxide, zirconium oxide, and vanadium oxide are mixed in such a manner that in the general formula $Li_tCoM_sO_2$, t=1.15, s=0.03 (V), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoV_{0.03}O_2$. A secondary battery of Example 8 is formed by executing subsequent steps in a manner similar to those in Example 1.

Example 9

As a cathode material I, commercially available lithium carbonate, cobalt oxide, zirconium oxide, and chromium oxide are mixed in such a manner that in the general formula $Li_tCoM_sO_2$, t=1.15, s=0.03 (Cr), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoCr_{0.03}O_2$. A secondary battery of Example 9 is formed by executing subsequent steps in a manner similar to those in Example 1.

Example 10

As a cathode material I, commercially available lithium carbonate, cobalt oxide, zirconium oxide, and titanium oxide are mixed in such a manner that in the general formula $Li_tCoM_sO_2$, t=1.15, s=0.03 (Ti), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoTi_{0.03}O_2$. A secondary battery of Example 10 is formed by executing subsequent steps in a manner similar to those in Example 1.

Example 11

As a cathode material I, commercially available lithium carbonate, cobalt oxide, zirconium oxide, and boric acid are mixed in such a manner that in the general formula $Li_tCoM_sO_2$, t=1.15, s=0.03 (B), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoB_{0.03}O_2$. A secondary battery of Example 11 is formed by executing subsequent steps in a manner similar to those in Example 1.

Example 12

As a cathode material I, commercially available lithium carbonate, cobalt oxide, zirconium oxide, and calcium hydroxide acid are mixed in such a manner that in the general formula $Li_tCoM_sO_2$, t=1.15, s=0.03 (Ca), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoCa_{0.03}O_2$. A secondary battery of Example 12 is formed by executing subsequent steps in a manner similar to those in Example 1.

<Comparison 1>

As a cathode material I, commercially available lithium carbonate and cobalt oxide are mixed in such a manner that in the general formula $Li_tCoM_sO_2$, t=1.15 and s=0 (Ca). They are baked in the atmosphere, thereby forming the powdery lithium cobalt composite oxide ($Li_{1.15}CoO_2$). A secondary battery of Comparison 1 is formed by executing subsequent steps in a manner similar to those in Example 1.

<Comparison 2>

As a cathode material I, commercially available lithium carbonate, cobalt oxide, and zirconium oxide are mixed in such a manner that in the general formula $Li_tCoM_sO_2$, t=1.15, s=0, and the content of zirconium Zr is equal to 0.0200 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoO_2$. A secondary battery of Comparison 2 is formed by executing subsequent steps in a manner similar to those in Example 1.

<Comparison 3>

As a cathode material I, commercially available lithium carbonate, cobalt oxide, zirconium oxide, and aluminum hydroxide are mixed in such a manner that in the general formula $Li_tCoM_sO_2$, t=1.15, s=0.05 (Al), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoAl_{0.05}O_2$. A secondary battery of Comparison 3 is formed by executing subsequent steps in a manner similar to those in Example 1.

<Comparison 4>

As a cathode material I, commercially available lithium carbonate, cobalt oxide, zirconium oxide, and magnesium carbonate are mixed in such a manner that in the general formula $Li_tCoM_sO_2$, t=1.15, s=0.05 (Mg), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoMg_{0.05}O_2$. A secondary battery of Comparison 4 is formed by executing subsequent steps in a manner similar to those in Example 1.

<Comparison 5>

As a cathode material I, commercially available lithium carbonate, cobalt oxide, zirconium oxide, aluminum hydroxide, and magnesium carbonate are mixed in such a manner that in the general formula $Li_tCoM_sO_2$, t=1.15, s=0.05 (Al; 0.025, Mg; 0.025), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoAl_{0.25}Mg_{0.25}O_2$. A secondary battery of Comparison 5 is formed by executing subsequent steps in a manner similar to those in Example 1.

<Comparison 6>

As a cathode material I, commercially available lithium carbonate, cobalt oxide, zirconium oxide, and ferric hydroxide are mixed in such a manner that in the general formula $Li_tCoM_sO_2$, t=1.15, s=0.05 (Fe), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoFe_{0.05}O_2$. A secondary battery of Comparison 6 is formed by executing subsequent steps in a manner similar to those in Example 1.

<Comparison 7>

As a cathode material I, commercially available lithium carbonate, cobalt oxide, zirconium oxide, and vanadium oxide are mixed in such a manner that in the general formula $Li_tCoM_sO_2$, t=1.15, s=0.05 (V), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoV_{0.05}O_2$. A secondary battery of Comparison 7 is formed by executing subsequent steps in a manner similar to those in Example 1.

<Comparison 8>

As a cathode material I, commercially available lithium carbonate, cobalt oxide, zirconium oxide, and chromium oxide are mixed in such a manner that in the general formula $Li_tCoM_sO_2$, t=1.15, s=0.05 (Cr), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoCr_{0.05}O_2$. A secondary battery of Comparison 8 is formed by executing subsequent steps in a manner similar to those in Example 1.

<Comparison 9>

As a cathode material I, commercially available lithium carbonate, cobalt oxide, zirconium oxide, and titanium oxide are mixed in such a manner that in the general formula $Li_tCoM_sO_2$, t=1.15, s=0.05 (Ti), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoTi_{0.05}O_2$. A secondary battery of Comparison 9 is formed by executing subsequent steps in a manner similar to those in Example 1.

<Comparison 10>

As a cathode material I, commercially available lithium carbonate, cobalt oxide, zirconium oxide, and boric acid are mixed in such a manner that in the general formula $Li_tCoM_sO_2$, t=1.15, s=0.05 (B), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoB_{0.05}O_2$. A secondary battery of comparison 10 is formed by executing subsequent steps in a manner similar to those in Example 1.

<Comparison 11>

As a cathode material I, commercially available lithium carbonate, cobalt oxide, zirconium oxide, and calcium hydroxide acid are mixed in such a manner that in the general formula $Li_tCoM_sO_2$, t=1.15, s=0.05 (Ca), and the content of zirconium Zr is equal to 0.0010 as a mole ratio Zr/Co to cobalt Co. They are baked in the atmosphere, thereby forming the powdery zirconium-containing lithium cobalt composite oxide. According to the zirconium-containing lithium cobalt composite oxide, zirconium Zr is contained as a sub-component element in the lithium cobalt composite oxide expressed by $Li_{1.15}CoCa_{0.05}O_2$. A secondary battery of Comparison 11 is formed by executing subsequent steps in a manner similar to those in Example 1.

In Examples 1 to 12 and Comparisons 1 to 11, the formed powdery zirconium-containing lithium cobalt composite oxides (cathode materials I) are measured by an X-ray diffracting method. Thus, it is determined that each of them is the material having almost the same structure as that of $LiCoO_2$. As peaks which could be confirmed, there are no peaks other than those derived by $LiCoO_2$. It has been found that each of those samples is formed by a single layer.

Further, in Examples 1 to 12 and Comparisons 1 to 11, the 50% arithmetic mean diameter of each of the cathode mate- Evaluation of Low-Temperature Output Characteristics At the third cycle of the non-aqueous electrolyte secondary battery formed by the similar steps, the output discharge is performed from the charge voltage of 4.2V at the environment temperature of 0° C. and 20 W. A voltage drop at this time is recorded.

Table 1 shows measurement results of the initial capacitance, initial charge/discharge efficiency, capacitance maintaining ratio at the 150th cycle, and voltage drop upon output at 0° C. and 20 W. In Table 1, r indicates a mole ratio Zr/Co of zirconium Zr to cobalt Co in the cathode material I.

TABLE 1

| | CATHODE MATERIAL I | | MIXTURE RATIO (CATHODE | INITIAL CA- | INITIAL CHARGE/ DISCHARGE | CAPACITANCE MAINTAINING RATIO UPON | VOLTAGE DROP UPON OUTPUT OF 20 W |
|---|---|---|---|---|---|---|---|
| | Zr r | M s | MATERIAL I:CATHODE MATERIAL II) | PACITANCE [mAh] | EFFICIENCY [%] | 150 CYCLES [%] | AT 0° C. [V] |
| EXAMPLE 1 | 0.0005 | — | — | 90:10 | 2474 | 96.7 | 94.3 | 3.31 |
| EXAMPLE 2 | 0.0010 | — | — | 90:10 | 2473 | 96.5 | 94.6 | 3.38 |
| EXAMPLE 3 | 0.0100 | — | — | 90:10 | 2468 | 96.5 | 95.2 | 3.42 |
| EXAMPLE 4 | 0.0010 | Al; 0.03 | — | 90:10 | 2410 | 93.5 | 96.8 | 3.36 |
| EXAMPLE 5 | 0.0010 | Mg; 0.03 | — | 90:10 | 2448 | 95.2 | 97.0 | 3.34 |
| EXAMPLE 6 | 0.0010 | Al; 0.015 | Mg; 0.015 | 90:10 | 2456 | 94.3 | 97.5 | 3.32 |
| EXAMPLE 7 | 0.0010 | Fe; 0.03 | — | 90:10 | 2434 | 95.4 | 95.8 | 3.33 |
| EXAMPLE 8 | 0.0010 | V; 0.03 | — | 90:10 | 2424 | 94.8 | 95.6 | 3.34 |
| EXAMPLE 9 | 0.0010 | Cr; 0.03 | — | 90:10 | 2437 | 94.3 | 95.7 | 3.36 |
| EXAMPLE 10 | 0.0010 | Ti; 0.03 | — | 90:10 | 2422 | 94.6 | 96.2 | 3.34 |
| EXAMPLE 11 | 0.0010 | B; 0.03 | — | 90:10 | 2436 | 94.2 | 94.5 | 3.33 |
| EXAMPLE 12 | 0.0010 | Ca; 0.03 | — | 90:10 | 2412 | 94.1 | 94.7 | 3.35 |
| COMPARISON 1 | 0.0000 | — | — | 90:10 | 2482 | 96.3 | 94.3 | 3.25 |
| COMPARISON 2 | 0.0200 | — | — | 90:10 | 2376 | 91.2 | 95.3 | 3.43 |
| COMPARISON 3 | 0.0010 | Al; 0.05 | — | 90:10 | 2375 | 89.6 | 96.1 | 3.31 |
| COMPARISON 4 | 0.0010 | Mg; 0.05 | — | 90:10 | 2392 | 91.4 | 94.3 | 3.34 |
| COMPARISON 5 | 0.0010 | Al; 0.025 | Mg; 0.025 | 90:10 | 2384 | 92.8 | 94.5 | 3.27 |
| COMPARISON 6 | 0.0010 | Fe; 0.05 | — | 90:10 | 2329 | 92.1 | 94.6 | 3.30 |
| COMPARISON 7 | 0.0010 | V; 0.05 | — | 90:10 | 2356 | 92.0 | 94.2 | 3.31 |
| COMPARISON 8 | 0.0010 | Cr; 0.05 | — | 90:10 | 2365 | 92.8 | 94.4 | 3.34 |
| COMPARISON 9 | 0.0010 | Ti; 0.05 | — | 90:10 | 2347 | 93.8 | 94.4 | 3.40 |
| COMPARISON 10 | 0.0010 | B; 0.05 | — | 90:10 | 2369 | 92.6 | 94.5 | 3.25 |
| COMPARISON 11 | 0.0010 | Ca; 0.05 | — | 90:10 | 2378 | 93.0 | 94.2 | 3.28 | rials I is adjusted to 15 μm. The 50% arithmetic mean diameter of each of the cathode materials II is adjusted to 5 μm. The 50% arithmetic mean diameter (D50) is measured by using a laser diffracting/scattering type measuring apparatus.

Measurement of Initial Capacitance and Initial Charge/Discharge Efficiency

With respect to the secondary batteries of Examples 1 to 12 and Comparisons 1 to 11 formed as mentioned above, the charge is executed under conditions of an environment temperature of 25° C., a charge voltage of 4.20V, a charge current of 1000 mA, and a charging time of 2.5 hours. After that, the discharge is executed at a discharge current of 750 mA and a final voltage of 3.0V, thereby obtaining an initial capacitance. Subsequently, an initial charge/discharge efficiency is obtained on the basis of the initial capacitance obtained as mentioned above.

Measurement of Capacitance Maintaining Ratio

Further, the charge and discharge are repeated at the environment temperature of 25° C., a discharge capacitance at the 150th cycle is measured, and a capacitance maintaining ratio for the initial capacitance is obtained. The capacitance maintaining ratio is obtained by the following equation 1.

Capacitance maintaining ratio (%)=(discharge capacitance at the 150th cycle/initial capacitance)×100   (Equation 1)

As shown in Table 1, as a cathode material I, there is used a cathode active material obtained by adding $Li_{1.10}Co_{0.98}Al_{0.01}Mg_{0.01}$ as a cathode material II to a zirconium-containing lithium cobalt composite oxide in which the content of zirconium Zr is set to a value within a range from 0.0005 or more to 0.01 or less as a mole ratio Zr/Co to cobalt Co and s is set to a value within a range of $0 \leq s \leq 0.03$. Thus, it has been confirmed that the cycle characteristics and the low-temperature output characteristics are fairly improved.

Examples 13 to 16, Comparisons 12 to 14

Example 13

As a cathode material I, a zirconium-containing lithium cobalt composite oxide ($Li_{1.15}CoAl_{0.01}Mg_{0.01}O_2$) containing zirconium Zr by an amount of 0.005 as a mole ratio Zr/Co to a content of cobalt Co is used. As a cathode material II, a lithium cobalt composite oxide ($Li_{1.10}CoO_2$) adjusted so that x=1.10 and y=0 is used. A weight ratio of the cathode material I to the cathode material II is set to (cathode material I:cathode material II=60:40). A secondary battery of Example 13 is formed by executing subsequent steps in a manner similar to those in Example 1.

Example 14

As a cathode material II, a lithium cobalt composite oxide ($Li_{1.10}Co_{0.97}Al_{0.03}O_2$) adjusted so that x=1.10 and y=0.03 (Al) is used. A secondary battery of Example 14 is formed by executing subsequent steps in a manner similar to those in Example 13.

The cathode active materials used in the secondary batteries of Examples 13 to 16 and Comparisons 12 to 14 formed as mentioned above are charged to 4.20V in a coin cell and dried. A heat generation start temperature by the DSC is measured by using the dried cathode active materials.

Table 2 shows measurement results of the initial capacitance, initial charge/discharge efficiency, capacitance maintaining ratio at the 150th cycle, and voltage drop upon output at 0° C. and 20 W.

TABLE 2

| | CATHODE MATERIAL II A | | MIXTURE RATIO (CATHODE MATERIAL I:CATHODE MATERIAL II) | INITIAL CAPACITANCE [mAh] | INITIAL CHARGE/ DISCHARGE EFFICIENCY [%] | HEAT GENERATION START TEMPERATURE OF CATHODE BY DSC [° C.] | VOLTAGE DROP UPON OUTPUT OF 20 W AT 0° C. [V] |
| --- | --- | --- | --- | --- | --- | --- | --- |
| | | y | | | | | |
| EXAMPLE 13 | — | — | 60:40 | 2471 | 95.7 | 240 | 3.32 |
| EXAMPLE 14 | Al; 0.03 | — | 60:40 | 2468 | 94.5 | 251 | 3.38 |
| EXAMPLE 15 | Mg; 0.03 | — | 60:40 | 2461 | 94.7 | 248 | 3.42 |
| EXAMPLE 16 | Al; 0.015 | Mg; 0.015 | 60:40 | 2466 | 94.2 | 246 | 3.36 |
| COMPARISON 12 | Al; 0.05 | — | 60:40 | 2378 | 90.5 | 256 | 3.25 |
| COMPARISON 13 | Mg; 0.05 | — | 60:40 | 2372 | 89.6 | 252 | 3.26 |
| COMPARISON 14 | Zr; 0.005 | — | 60:40 | 2456 | 94.6 | 230 | 3.39 |

Example 15

As a cathode material II, a lithium cobalt composite oxide ($Li_{1.10}Co_{0.97}Mg_{0.03}O_2$) adjusted so that x=1.10 and y=0.03 (Mg) is used. A secondary battery of Example 15 is formed by executing subsequent steps in a manner similar to those in Example 13.

Example 16

As a cathode material II, a lithium cobalt composite oxide ($Li_{1.10}CO_{0.97}Al_{0.015}Mg_{0.015}O_2$) adjusted so that x=1.10 and y=0.03 (Al; 0.015, Mg; 0.015) is used. A secondary battery of Example 16 is formed by executing subsequent steps in a manner similar to those in Example 13.

<Comparison 12>

As a cathode material II, a lithium cobalt composite oxide ($Li_{1.10}Co_{0.95}Al_{0.05}O_2$) adjusted so that x=1.10 and y=0.05 (Al) is used. A secondary battery of Comparison 12 is formed by executing subsequent steps in a manner similar to those in Example 13.

<Comparison 13>

As a cathode material II, a lithium cobalt composite oxide ($Li_{1.10}Co_{0.95}Mg_{0.05}O_2$) adjusted so that x=1.10 and y=0.05 (Mg) is used. A secondary battery of Comparison 13 is formed by executing subsequent steps in a manner similar to those in Example 13.

<Comparison 14>

As a cathode material II, a lithium cobalt composite oxide ($Li_{1.10}Co_{0.995}Zr_{0.005}O_2$) adjusted so that x=1.10 and y=0.005 (Zr) is used. A secondary battery of Comparison 14 is formed by executing subsequent steps in a manner similar to those in Example 13.

With respect to the secondary batteries of Examples 13 to 16 and Comparisons 12 to 14 formed as mentioned above, an initial capacitance and an initial charge/discharge efficiency are measured and low-temperature output characteristics are evaluated in a manner similar to that in Example 1.

Measurement of Heat Generation Start Temperature by DSC (Differential Scanning Calorimetry)

As shown in Table 2, it will be understood that, in the cathode material II, by using aluminum Al and magnesium Mg at a ratio within a range of $0 \leq y \leq 0.03$, the initial capacitance, initial charge/discharge efficiency, and low-temperature output characteristics can be improved. Further, it has been confirmed that by using aluminum Al and magnesium Mg at a ratio within a range of $0 \leq y \leq 0.03$, the heat stability can be improved.

Examples 6 and 17 to 19, Comparisons 15 and 16

Example 17

A secondary battery of Example 17 is formed in a manner similar to that in Example 6 except that the cathode material I and cathode material II are mixed so that their weight ratio is equal to (cathode material I:cathode material II=85:15).

Example 18

A secondary battery of Example 18 is formed in a manner similar to that in Example 6 except that the cathode material I and cathode material II are mixed so that their weight ratio is equal to (cathode material I:cathode material II=75:25).

Example 19

A secondary battery of Example 19 is formed in a manner similar to that in Example 6 except that the cathode material I and cathode material II are mixed so that their weight ratio is equal to (cathode material I:cathode material II=60:40).

<Comparison 15>

A secondary battery of Comparison 15 is formed in a manner similar to that in Example 6 except that the cathode material I and cathode material II are mixed so that their weight ratio is equal to (cathode material I:cathode material II=100:0).

<Comparison 16>

A secondary battery of Comparison 16 is formed in a manner similar to that in Example 6 except that the cathode material I and cathode material II are mixed so that their weight ratio is equal to (cathode material I:cathode material II=50:50).

With respect to the secondary batteries of Examples 6 and 17 to 19 and Comparisons 15 and 16, the initial capacitance is measured, the initial charge/discharge efficiency is measured, the low-temperature output characteristics are evaluated, and the cycle characteristics at the high charge voltage of 4.4V are evaluated in a manner similar to that in Example 1. Further, in Examples 6, 17, and 18 and Comparisons 15 and 16, the electrode volume density is measured.

Measurement of Volume Density of Electrode

The electrode volume density is measured as follows. The formed cathode is punched into a circular shape of φ20 mm. A thickness and a weight of the punched cathode are measured. A thickness and a weight of the Al foil are subtracted from the measured thickness and weight. The obtained weight is divided by a volume.

Table 3 shows measurement results of the initial capacitance, initial charge/discharge efficiency, heat generation start temperature of the electrode by the DSC, and voltage drop upon output at 0° C. and 20 W. In Table 3, r indicates the mole ratio of zirconium Zr to cobalt Co in the cathode material I.

$Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 10 μm is used. The cathode material I and cathode material II are mixed so that their weight ratio is equal to (cathode material I:cathode material II=85:15). A secondary battery of Example 20 is formed by executing subsequent steps in a manner similar to those in Example 1.

Example 21

As a cathode material I, a zirconium-containing lithium cobalt composite oxide which has zirconium Zr by an amount of 0.001 as a mole ratio Zr/Co to cobalt Co and whose 50% arithmetic mean diameter is equal to 30 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 2 μm is used. The cathode material I and cathode material II are mixed so that their weight ratio is equal to (cathode material I:cathode

TABLE 3

| CATHODE MATERIAL I | | | MIXTURE RATIO (CATHODE MATERIAL I:CATHODE MATERIAL II) | INITIAL CAPACITANCE [mAh] | INITIAL CHARGE/ DISCHARGE EFFICIENCY [%] | CAPACITANCE MAINTAINING RATIO UPON 150 CYCLES [%] | VOLTAGE DROP UPON OUTPUT OF 20 W AT 0° C. [V] | MAX. VOLUME DENSITY OF ELECTRODE [g/cm³] | CAPACITANCE MAINTAINING RATIO UPON 150 CYCLES AT CHARGE [%] |
|---|---|---|---|---|---|---|---|---|---|
| | Zr r | M s | | | | | | | |
| EXAMPLE 6 | 0.0010 | Al; 0.015 Mg; 0.015 | 90:10 | 2456 | 94.3 | 97.5 | 3.32 | 3.63 | 95.7 |
| EXAMPLE 7 | 0.0010 | Al; 0.015 Mg; 0.015 | 85:15 | 2480 | 94.5 | 97.6 | 3.36 | 3.68 | 95.6 |
| EXAMPLE 8 | 0.0010 | Al; 0.015 Mg; 0.015 | 75:25 | 2445 | 94.6 | 97.5 | 3.33 | 3.60 | 95.3 |
| EXAMPLE 9 | 0.0010 | Al; 0.015 Mg; 0.015 | 60:40 | 2404 | 94.6 | 97.8 | 3.38 | 3.55 | 95.3 |
| COMPARISON 15 | 0.0010 | Al; 0.015 Mg; 0.015 | 100:0 | 2352 | 94.3 | 97.7 | 3.40 | 3.44 | 96.3 |
| COMPARISON 16 | 0.0010 | Al; 0.015 Mg; 0.015 | 50:50 | 2341 | 94.5 | 97.5 | 3.36 | 3.43 | 94.3 |

As shown in Table 3, even if an addition ratio of the cathode material II is set to be smaller than 10 wt % or, contrary, even if it is equal to or larger than 40 wt %, the electrode volume density decreases, so that the initial capacitance decreases. Therefore, it is desirable that a mixture ratio of the cathode material II lies within a range from 10 wt % or more to 40 wt % or less. It is desirable that the electrode volume density is equal to or larger than 3.50 g/cm³ in consideration of the initial capacitance. Also in Example 13 of the highest filling performance, it has been confirmed that it does not exceed 3.70 g/cm³ at the maximum pressure.

Examples 20 to 23, Comparisons 17 to 19

Example 20

As a cathode material I, a zirconium-containing lithium cobalt composite oxide which has zirconium Zr by an amount of 0.001 as a mole ratio Zr/Co to cobalt Co and whose 50% arithmetic mean diameter is equal to 30 μm is used. According to the zirconium-containing lithium cobalt composite oxide, zirconium Zr is contained as a sub-component element in the lithium cobalt composite oxide expressed by material II=85:15). A secondary battery of Example 21 is formed by executing subsequent steps in a manner similar to those in Example 1.

Example 22

As a cathode material I, a zirconium-containing lithium cobalt composite oxide which has zirconium Zr by an amount of 0.001 as a mole ratio Zr/Co to cobalt Co and whose 50% arithmetic mean diameter is equal to 10 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 10 μm is used. The cathode material I and cathode material II are mixed so that their weight ratio is equal to (cathode material I:cathode material II=85:15). A secondary battery of Example 22 is formed by executing subsequent steps in a manner similar to those in Example 1.

Example 23

As a cathode material I, a zirconium-containing lithium cobalt composite oxide which has zirconium Zr by an amount of 0.001 as a mole ratio Zr/Co to cobalt Co and whose 50% arithmetic mean diameter is equal to 10 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 2 μm is used. The cathode material I and cathode material II are mixed so that their weight ratio is equal to (cathode material I:cathode material II=85:15). A secondary battery of Example 23 is formed by executing subsequent steps in a manner similar to those in Example 1.

<Comparison 17>

As a cathode material I, a zirconium-containing lithium cobalt composite oxide which has zirconium Zr by an amount of 0.001 as a mole ratio Zr/Co to cobalt Co and whose 50% arithmetic mean diameter is equal to 40 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 10 μm is used. The cathode material I and cathode material II are mixed so that their weight ratio is equal to (cathode material I:cathode material II=85:15). A secondary battery of Comparison 17 is formed by executing subsequent steps in a manner similar to those in Example 1.

<Comparison 18>

As a cathode material I, a zirconium-containing lithium cobalt composite oxide which has zirconium Zr by an amount of 0.001 as a mole ratio Zr/Co to cobalt Co and whose 50% arithmetic mean diameter is equal to 15 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 15 μm is used. The cathode material I and cathode material II are mixed so that their weight ratio is equal to (cathode material I:cathode material II=85:15). A secondary battery of Comparison 18 is formed by executing subsequent steps in a manner similar to those in Example 1.

<Comparison 19>

As a cathode material I, a zirconium-containing lithium cobalt composite oxide which has zirconium Zr by an amount of 0.001 as a mole ratio Zr/Co to cobalt Co and whose 50% arithmetic mean diameter is equal to 5 μm is used. According to the zirconium-containing lithium cobalt composite oxide, zirconium Zr is contained as a sub-component element in the lithium cobalt composite oxide expressed by $Li_{1.15}CoAl_{0.015}Mg_{0.015}O_2$. As a cathode material II, the lithium cobalt composite oxide ($Li_{1.10}Co_{0.98}Al_{0.01}Mg_{0.01}O_2$) whose 50% arithmetic mean diameter is equal to 10 μm is used. The cathode material I and cathode material II are mixed so that their weight ratio is equal to (cathode material I:cathode material II=85:15). A secondary battery of Comparison 19 is formed by executing subsequent steps in a manner similar to those in Example 1.

With respect to the secondary batteries of Examples 20 to 23 and Comparisons 17 to 19, the initial capacitance is measured, the initial charge/discharge efficiency is measured, the capacitance maintaining ratio at the 150th cycle is measured, and the low-temperature output characteristics are evaluated.

Table 4 shows measurement results of the initial capacitance, the initial charge/discharge efficiency, the capacitance maintaining ratio at the 150th cycle, the voltage drop upon output at 0° C. and 20 W, and the maximum electrode volume density.

TABLE 4

| | CATHODE MATERIAL I D50 [μm] | CATHODE MATERIAL II D50 [μm] | MIXTURE RATIO (CATHODE MATERIAL I:CATHODE MATERIAL II) | INITIAL CAPACITANCE [mAh] | INITIAL CHARGE/DISCHARGE EFFICIENCY [%] | CAPACITANCE MAINTAINING RATIO UPON 150 CYCLES [%] | VOLTAGE DROP UPON OUTPUT OF 20 W AT 0° C. [V] | MAX. VOLUME DENSITY OF ELECTRODE [g/cm³] |
|---|---|---|---|---|---|---|---|---|
| EXAMPLE 20 | 30 | 10 | 85:15 | 2432 | 93.8 | 97.6 | 3.36 | 3.56 |
| EXAMPLE 21 | 30 | 2 | 85:15 | 2415 | 93.9 | 97.6 | 3.36 | 3.55 |
| EXAMPLE 22 | 10 | 10 | 85:15 | 2401 | 94.0 | 97.5 | 3.33 | 3.50 |
| EXAMPLE 23 | 10 | 2 | 85:15 | 2440 | 94.5 | 97.8 | 3.38 | 3.58 |
| COMPARISON 17 | 40 | 10 | 85:15 | 2352 | 92.5 | 97.7 | 3.25 | 3.48 |
| COMPARISON 18 | 15 | 15 | 85:15 | 2362 | 93.8 | 97.5 | 3.36 | 3.49 |
| COMPARISON 19 | 5 | 10 | 85:15 | 2249 | 94.1 | 97.5 | 3.38 | 3.32 |

As shown in Table 4, it has been confirmed that if the 50% arithmetic mean diameter of the cathode material I exceeds 30 μm, the electrode volume density does not increase and the low-temperature load characteristics also deteriorate. It has been also confirmed that if the arithmetic mean diameter of the cathode material I is less than 10 μm, the electrode volume density does not increase and the initial capacitance decreases. Further, it has been confirmed that if the 50% arithmetic mean diameter of the cathode material II exceeds 10 μm, the electrode volume density does not increase and the initial capacitance decreases.

The are not limited to the foregoing examples but many modifications and variations are possible within a scope without departing from the spirit of the invention. For example, the shapes are not particularly limited. A cylindrical shape, a rectangular shape, a coin shape, a button shape, or the like may be used. For example, the shape of the collector of the electrode is not particularly limited. Besides a foil shape, a mesh-like shape such as a mesh expanded metal or the like can be also used.

Further, although the first embodiment has been described with respect to the non-aqueous electrolyte secondary battery having the electrolytic solution as an electrolyte and the second embodiment has been described with respect to the non-aqueous electrolyte secondary battery having the gel electrolyte as an electrolyte, the embodiments are not limited to them.

For example, as an electrolyte, besides the foregoing electrolyte, a high molecular solid electrolyte using ion conductive high molecules, an inorganic solid electrolyte using ion conductive inorganic material, or the like can be used. They can be solely used or combined with another electrolyte and used. As a high molecular compound which can be used for the high molecular solid electrolyte, for example, polyether, polyester, polyphosphazene, polysiloxane, or the like can be mentioned. As an inorganic solid electrolyte, for example, ion conductive ceramics, ion conductive crystal, ion conductive glass, or the like can be mentioned.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   a first composite oxide; and
   a second composite oxide mixed with said first composite oxide,
   wherein said first composite oxide is a zirconium-containing lithium cobalt composite oxide containing zirconium as a sub-component element in a first lithium cobalt composite oxide, and said first lithium cobalt composite oxide is $Li_tCoM_sO_2$, where M denotes at least one kind of element selected from iron, vanadium, chromium, titanium, magnesium, aluminum, boron, and calcium, where s is a value within a range of $0 \leq s \leq 0.03$, and where t is a value within a range of $0.05 \leq t \leq 1.15$,
   wherein said second composite oxide is a second lithium cobalt composite oxide expressed by $Li_xCo_{1-y}A_yO_2$, where A denotes at least one kind of element selected from magnesium and aluminum, where x is a value within a range of $0.05 \leq x \leq 1.15$, and where y is a value within a range of $0 \leq y \leq 0.03$,
   wherein a content of said zirconium ranges from 0.0005 to 0.01 as a mole ratio Zr/Co to cobalt in the first lithium cobalt composite oxide, and
   wherein a content of the second lithium cobalt composite oxide ranges from 10 wt % to 40 wt %.

2. The cathode active material according to claim 1, wherein a 50% arithmetic mean diameter of said zirconium-containing lithium cobalt composite oxide ranges from 10 to 30 μm.

3. The cathode active material according to claim 1, wherein a 50% arithmetic mean diameter of said second lithium cobalt composite oxide ranges from 2 to 10 μm.

4. A non-aqueous electrolyte secondary battery comprising:
   a cathode having a cathode active material, the cathode active material including a first composite oxide and a second composite oxide mixed together;
   an anode;
   a non-aqueous electrolyte; and
   a separator,
   wherein said first composite oxide is a zirconium-containing lithium cobalt composite oxide containing zirconium as a sub-component element in a first lithium cobalt composite oxide, and said first lithium cobalt composite oxide is $Li_tCoM_sO_2$, where M denotes at least one kind of element selected from iron, vanadium, chromium, titanium, magnesium, aluminum, boron, and calcium, where s is a value within a range of $0 \leq s \leq 0.03$, and where t is a value within a range of $0.05 \leq t \leq 1.15$,
   wherein said second composite oxide is a second lithium cobalt composite oxide expressed by $Li_xCo_{1-y}A_yO_2$, where A denotes at least one kind of element selected from magnesium and aluminum, where x is a value within a range of $0.05 \leq x \leq 1.15$, and where y is a value within a range of $0 \leq y \leq 0.03$,
   wherein a content of said zirconium ranges from 0.0005 or more to 0.01 or less as a mole ratio Zr/Co to cobalt in the lithium cobalt composite oxide, and
   wherein a content of the second lithium cobalt composite oxide ranges from 10 wt % to 40 wt %.

5. The non-aqueous electrolyte secondary battery according to claim 4, wherein a 50% arithmetic mean diameter of said zirconium-containing lithium cobalt composite oxide ranges from 10 to 30 μm.

6. The non-aqueous electrolyte secondary battery according to claim 4, wherein a 50% arithmetic mean diameter of said second lithium cobalt composite oxide ranges from 2 to 10 μm.

7. The non-aqueous electrolyte secondary battery according to claim 4, wherein an electrode volume density of said cathode ranges from 3.45 to 3.70 g/cm³.

* * * * *